United States Patent [19]

Ueyama

[11] Patent Number: 4,707,123
[45] Date of Patent: Nov. 17, 1987

[54] FILM END HOLDING DEVICE

[75] Inventor: Tsutomu Ueyama, Yawata, Japan

[73] Assignee: Dainippon Screen Mfg. Co., Ltd., Kyoto, Japan

[21] Appl. No.: 869,654

[22] Filed: Jun. 2, 1986

[30] Foreign Application Priority Data

Jun. 3, 1985 [JP] Japan .............................. 60-120784

[51] Int. Cl.$^4$ ............................................. G03B 27/60
[52] U.S. Cl. .................................. 355/73; 355/3 DR; 355/76; 355/87; 355/91
[58] Field of Search ...................... 355/73, 76, 87, 91, 355/3 DR

[56] References Cited

U.S. PATENT DOCUMENTS

| 2,267,646 | 12/1941 | Gorig | 355/91 |
| 4,183,652 | 1/1980 | Yanagawa | 355/3 DR |
| 4,253,758 | 3/1981 | Cormier | 355/3 DR |
| 4,277,164 | 7/1981 | Fortmann | 355/3 DR |
| 4,298,278 | 11/1981 | Katakura et al. | 355/3 DR |

Primary Examiner—Monroe H. Hayes
Attorney, Agent, or Firm—Lowe, Price, LeBlanc, Becker & Shur

[57] ABSTRACT

A film end holding device comprises a film holding plate, an operating plate, guide bushes and a contact member, in which the operating plate moves obliquely when pushed in the axial direction of a drum on which a film is to be fixed. The holding plate moves in the circumferential direction of the drum, and the operating plate (17) runs on an angle portion of the holding plate so that an end of a film may be held by the contact member of the holding plate on the drum.

3 Claims, 13 Drawing Figures

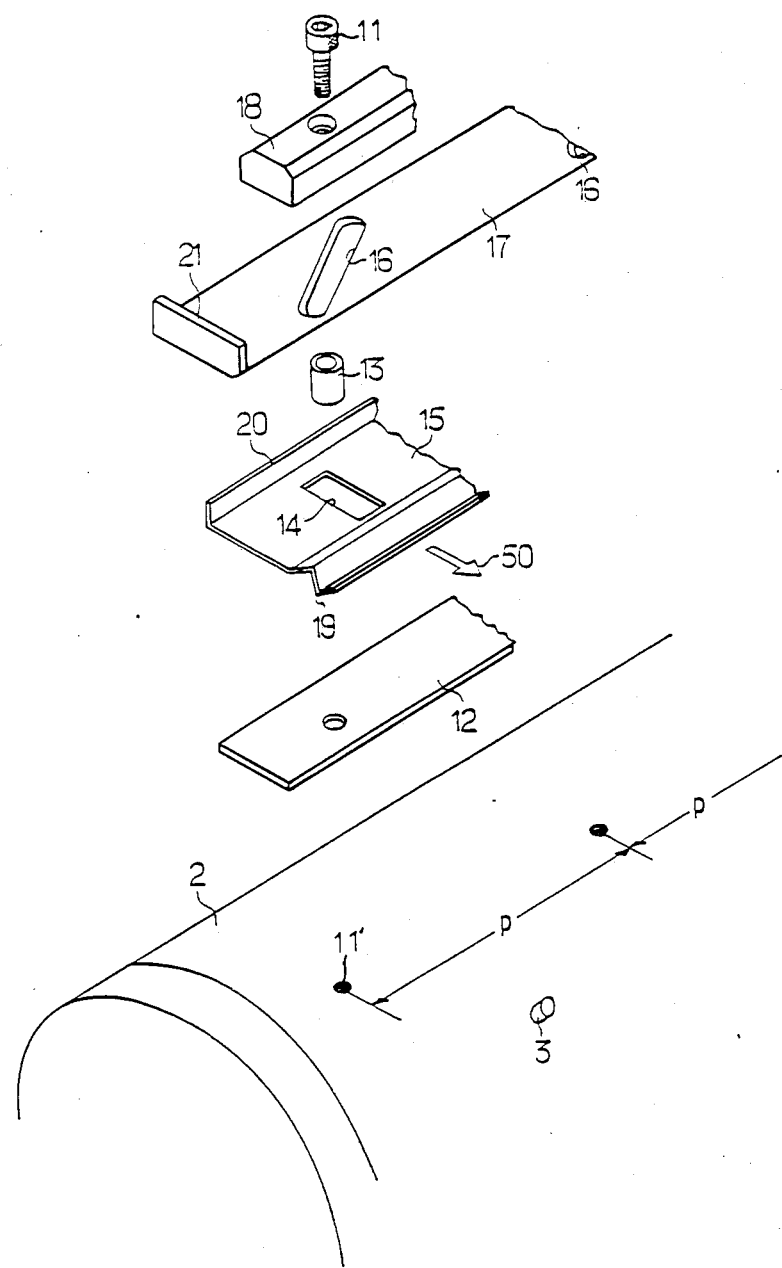

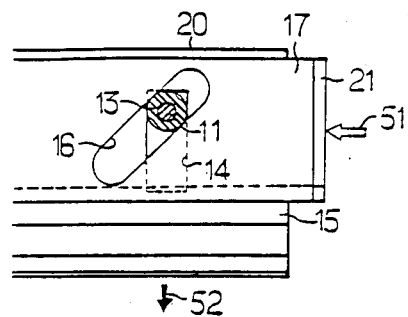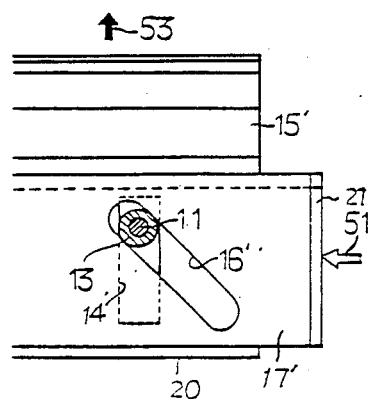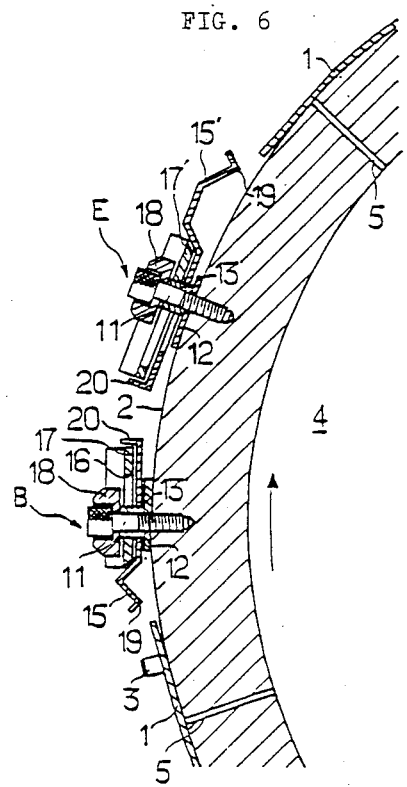

FILM END HOLDING DEVICE

BACKGROUND OF THE INVENTION

1. Field of the Invention

This invention relates to a film end holding device in which a photosensitive material such as sheet film taken up on a recording drum of a drum type image scanning and recording apparatus and drawn by vacuum suction is prevented from being released from a surface of the drum during rotation thereof.

2. Prior Art

In the recording section of a conventional drum type image scanning and recording apparatus, it is known that a photosensitive material such as sheet film or photographic printing paper (hereinafter referred to as "film") is detained at its initial end portion by engaging at least two slits formed near the film end at a certain distance with pins disposed on the periphery of each drum in parallel to the axis at the same distance and number as said slits, and/or fixed by taping. The film is then taken up on a recording drum being squeezed by a squeezing roller or under a certain tension, and the film end is either detained by terminal end pins or fixed to the drum by taping, etc. Further, the film is extensively fastened to the periphery of the recording drum being drawn by vacuum suction by way numerous small apertures formed on the periphery.

With such film holding methods, since the films are treated in a dark room, taping of the film end to the drum surface is difficult. Moreover, it is necessary for the terminal end of the film to be pasted up to prevent distortion in the recording image (linear distortion, desirable accuracy is less than 10 $\mu$m) while keeping the appropriate tension to the film. However, but such a paste up operation requires a certain level of skill and becomes more difficult with a larger film size. This means that the results of the pasting up operation vary depending on the skill of individual workers. A further problem exists in that surfaces of the drum and the film are stained by adhesive materials. Furthermore, when the initial end of a film is detained by two pins, for example, sagging may occur in the middle portion of the film due to the weight of the film itself, eventually causing the linear distortion in the recording image.

It is also to be noted that a rather complicated and expensive device is required for automatization of film setting and removing, i.e., a series of operations such as detention of the film terminal end by pinning or taping to keep a certain tension, and detaching the film from the drum after exposure.

When a film is fixed to the drum surface using vacuum suction alone without pinning and taping, a still further problem arises in the case of power failure or malfunction of a vacuum suction device, i.e., the film unavoidably and unexpectedly releases from the drum surface, resulting in a loss thereof.

SUMMARY OF THE INVENTION

Accordingly, it is an object of the invention to provide a film end holding device in which a known manual operation of fixing initial and terminal ends of a film to a surface of a recording drum in a dark room is successfully replaced with a simple holding operation that does not require an operator to touch the film, and in which fixation of the initial and terminal ends of the film to the drum surface can be performed at any operating position so as not to abut against an objective lens of a recording unit without occurence of linear distortion in a recording image due to film setting. Such film end holding device will make a step forward to an automatic film setting and detaching device in the future whereby unexpected release of a film is completely prevented.

To solve the above-discussed problem, a film end holding device in accordance with the invention comprises a drum on the periphery of which a film is mounted and taken up thereon. A portion of the drum near an end of the film is provided with a film holding plate, an operating plate, a plurality of guide bushes and a contact member. The holding plate has a plurality of guide slots in the circumferential direction of the drum. An extending side of the holding plate opposed to the end of the film is formed into an angular portion with its front end bent to be a film contact portion, while the opposite extending side is bent to be a turnup. The operating plate has a plurality of guide slots oblique to the axial direction of the drum for sliding in the axial direction of the drum within bent portions of the holding plate. The contact member of sufficient rigidity is fixed to the drum by engaging the guide slots of the holding plate and the operating plate with the guide bushes so that the holding plate may slide in the circumferential direction on the drum surface while holding the operating plate inside by means of a plurality of set bolts through said plural guide bushes. The operating plate moves obliquely when pushed in the axial direction of the drum, whereby the holding plate moves in the circumferential direction of the drum by the length of the guide slots. The operating plate runs on the angle portion of the holding plate so that the end of the film may be held by curving the contact portion of the holding plate toward the drum surface.

Further, a sheet plate is fixed to the drum by a guide bush so that the holding plate may be easy to slide in the circumferential direction on the surface of the drum.

In addition, the operating plate is chamfered in such manner that the extending portion thereof contacting an upper inclined surface of the angle-shaped portion of the holding plate serves in cooperation with an upper inclined surface of the holding plate so that the operating plate may easily run on the holding plate.

When the operating plate is pushed from outside along the axial direction of the drum, the operating plate moves obliquely since the slits are formed in the operating plate obliquely to the pushing direction and the guide bushes fixed to the drum are engaged with the guide slits. Further, the operating plate superposed on the holding plates between the upper inclined surface of the extending side opposed to the end of the film and the turnup, and the guide slits of the holding plates engaged with the guide bushes are formed orthogonally to the pushing direction. Accordingly, the holding plates are moved only in the direction orthogonal to the axial direction of the drum by the operating plate which moves obliquely. When the operating plate is pushed further, since the holding plates are detained by contact of the guide bushes with the inner end face of the guide slits, an extending side of the operating plate runs on the upper inclined surface of the angular extending side of the holding plates; the holding plates coming near the end of the film are curved toward the drum side and the film contact portion holds the end portion of the film.

The film end holding device according to the invention can be simply attached to the drum, and particularly the delicate manual operation of fixing the initial and terminal ends of a film to the surface of the recording drum by taping, etc. in a dark room can be replaced with a simple pushing operation. Thus, attachment of the initial and terminal ends of the film to the drum surface can be easily performed even by an unskilled worker. Since the film contact portion of the holding plate does not contact the film when moving, the film is prevented from being corrugated or damaged due to paste up at the time of fixing it to the drum. Since corrugation due to paste up does not occur and pinning of the film is omitted, the film is free from sagging. Furthermore, since it is not required for a worker to touch the film, any external force which may cause film distortion is not applied to the film, and as a result a recording image is prevented from linear distortion in the film setting operation.

BRIEF DESCRIPTION OF THE DRAWINGS

FIG. 4 is an exploded view of principal components of the device;

FIG. 5(A) is a partial plan view of the actuation of the device for the initial end of a film and FIG. 5(B) is a partial plan view of the device for the terminal end thereof;

FIG. 6 is a sectional side view of the device;

DESCRIPTION OF THE PREFERRED EMBODIMENT

Figure 1:
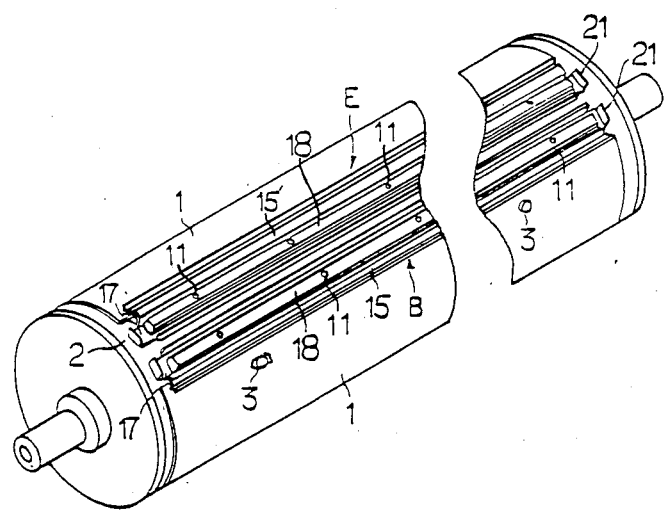
FIG. 1 is a perspective view of an embodiment of the invention in which a film end holding device is fitted on a recording drum of a drum type image recording apparatus.
Figure 2:
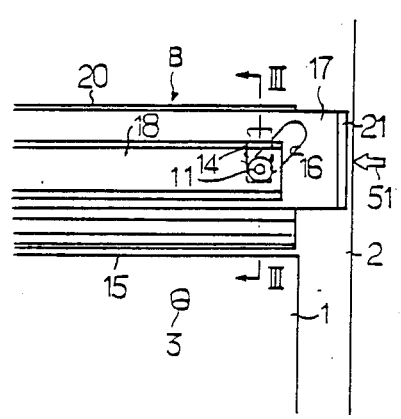
FIG. 2 is a partial plan view of an arrangement of the device for receiving the initial end of a film.
Figure 3:
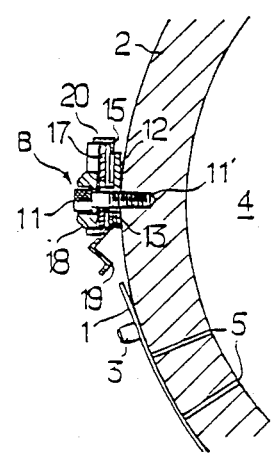
FIG. 3 is a sectional side view taken along the line III—III of FIG. 2.

In FIG. 1, film end holding devices (B), (E), one for the initial end of a film and the other for terminal end thereof, are fitted on a recording drum of a drum type image recording apparatus, and FIGS. 2 and 3 show a partial plan view and a sectional view of the device for initial end side of the film.

The film (1) is taken up on the recording drum (2) being squeezed by a roller (not shown) to prevent sagging, after engaging a pair of film positioning pins (3) disposed on the peripheral surface of the recording drum (2) parallel to the axial direction thereof with apertures (usually one is round-shaped, and the other elongated) formed to receive pins (3) near the initial end of the film (1). The film (1) is then drawn by vacuum suction (applied through small apertures (5) extending through the peripheral surface of the drum (2) to a hollow portion (4)), and fixed to the drum (2) being held by the film end holding devices (B) and (E) on which the initial and terminal ends of the film (1) are respectively fitted.

Described hereunder is a construction of the device (B) for the initial end of the film referring to FIG. 4.

The film end holding device (B) comprises a belt-like sheet plate (12) fixed on the peripheral surface of the drum (2) by a bolt (11) with its longitudinal direction coincident with the axial direction of the drum. A holding plate (15) is superposed on the sheet plate (12) with its longitudinal direction coincident to that of the sheet plate and on which a guide slot (14) is formed so that a guide bush (13) engaged with bolt (11) with a hexagonal set hole may slide in the slot in the circumferential direction of the drum. An operating plate (17) is superposed on the holding plate (15) with its longitudinal direction coincident to that of the holding plate (15) and on which a guide slot (16) is formed so that guide bush (13) may slide in the slot obliquely to the circumferential direction of the drum. A contact member (18) is superposed on the operating plate (17) with its longitudinal direction coincident to that of the actuation plate and on which a stepped aperture for receiving a head of the bolt (11) is formed so that the sheet plate (12) may be held on the surface of the drum (2) through the guide bush (13) by the bottom face of the bolt (11) when the bolt is tightened.

Bolt (11) with a hexagonal set hole is screwed in one of a plurality of tapped holes (11') (for example, 8 holes) formed on the peripheral surface of the drum (2) in the axial direction at a certain distance p (for example, about 100 mm). Accordingly, the rectangular guide slots (14) formed on the holding plate (15) orthogonal to the longitudinal direction of the plate (15) (i.e., rotational direction of the drum (2)) and the guide slots (16) formed on the operating plate (17) oblique to the longitudinal direction of the plate (17) are arranged in the same number as the tapped holes (11') in the same axial direction. Since the length of the guide bush (13) is as designed as to be a little longer than the total thickness of the holding plate (15) and the operating plate (17), when the bolt (11) with a hexagonal set hole is tightened and the contact member (18) brings the sheet plate (12) into contact with the surface of the drum (2) through the guide bush (13), this guide bush (13) serves also as a kind of spacer, so that the holding plate (15) and the operating plate (17) can slide between the sheet plate (12) and the contact member (18), although the contact member (18) and the sheet plate (12) are fixed on the surface of the drum (2).

Sheet plate (12) forms a sliding surface on the drum (2) on which the holding plate (15) can slide smoothly without damaging the surface of the drum (2) in the direction of the arrow (50) (see FIG. 4), i.e., in the direction approaching the initial end of the film (1) on the plane contacting the peripheral surface of the drum (2). The setting hole on the sheet plate (12) for insertion of the bolt (11) is not located on the center line thereof but near the initial end side of the film (1) so that, when the holding plate (15) comes near the initial end of the film (1), a sufficient overhang from the sheet plate (12) may be insured and that flexibility be easily produced in the holding plate (15) by the operation of the operating plate (17).

The width of the holding plate (15) is larger than that of the sheet plate (12) so that the extended part of the bottom face of the holding plate (15) may contact the sheet plate (12) to effect parallel displacement with respect to the sheet plate (12) when moving toward the initial end side of the film (1) by the actuation of the operating plate (17). An extending side of the holding plate opposed to the initial end of the film (1) is bent to form an angle, and the front end portion thereof is further bent to form a small turnup (19) which acts as a contact portion to the film (1), while the opposite extending side is bent upward in a right angle to form a turnup (20).

The operating plate (17) is composed of a belt-like plate slightly thicker than the holding plate (15). When the operating plate (17) is not operated, it is stored between the upwardly inclined surface of the angle portion of the holding plate (15) opposed to the initial end side of the film (1) and the turnup (20) as shown in FIGS. 2 and 3, and therefore the extending side of the actuation plate (17) contacting the upwardly inclined surface of the angle portion of the holding plate (15) is chamfered to serve in cooperation with said inclined surface. Both end portions of the operating plate (17) are bent upward to form a turnup (21), and as to the length, the operating plate (17) is longer than the holding plate (15) by an actuation stroke in the longitudinal direction.

The contact member (18) is so designed that a section thereof may have rigidity sufficiently greater than that of the holding plate (15) and the operating plate (17), and accordingly when centrifugal force produced respectively in the contact member (18) itself, the holding plate (15) and the operating plate (17) act on the contact member (18), no flexibility occurs in the portion between the bolts (11). Flexibility produced in the holding plate (15) and the operating plate (17) due to their centrifugal forces may be restrained by the contact member (18). As for the length, the contact member (18) is a little shorter than the holding plate (15) to prevent the operating plate (17) from interference therewith.

In addition, an objective lens of the recording head is distant from the surface of the film fixed to the drum (2) by only 7 mm or so, and therefore a head of the bolt (11) projecting highest from the surface of the drum (2) of all other members in this film end holding device (B) is designed so as not to abut against the objective lens.

The film end holding device (E) for holding the terminal end of a film in this embodiment comprises almost the same components as the film end holding device (B) for holding the initial end described above. But in the case of the terminal end holding device (E), since the terminal end of a film is not detained by positioning pins (3) at the pin holes being different from the initial end and there is the possibility that the terminal end floats (lifts) above the surface of the drum (2) due to the centrifugal force at the time of high speed rotation, it is necessary for the film (1) to be firmly held. Further, as shown in FIG. 6, in the case of the terminal end of the film, since a free end thereof from the small aperture (5) for drawing by vacuum suction is designed longer than a free end of the initial end from the positioning pin (3), there arise following differences between the holding devices (B) and (E) in their constructions.

In FIG. 6 showing a sectional side view of the film end holdng devices (B) and (E), the extending side of the holding plate (15') on the terminal end side of the film (1) is trapezoidally shaped with a plain portion on its top. In order to insure a sufficient overhang of the turnup (19) acting as a film holding section from the sheet plate (12), and to curve the holding plate (15') sufficient for holding the rear end of the film (1) at the turnup (19), the width of the actuation plate (17') is secured sufficiently large so as to be able to increase actuation strokes. Accordingly, in the holding plate (15'), a distance between the upwardly inclined surface of the angle portion on the extending side opposed to the rear end of the film (1) and the turnup (20) on the opposite side is enlarged.

Operation of the film end holding device (B) for the initial end is now described.

First, the film (1) is placed on the peripheral surface of the drum (2) and drawn thereagainst by vacuum suction to prevent sag while the film positioning pins (3) are engaged with the pin holes on the initial end of the film (1). Then in the state shown in FIG. 2, the operating plate (17) is pushed by the turnup (21) in the direction of the arrow (51), i.e., in the axial direction. Since the guide bush (13) fixed to the drum (2) is engaged with the guide slot (16) formed right upward on the operating plate (17), the operating plate pushed in the direction of the arrow moves to the left and downward in FIG. 2. Since the operating plate (17) is held between the turnup (20) and the upwardly inclined surface of the angle portion of the holding plate (15), the holding plate (15) moves together with the operation of the operating plate (17), but downward, i.e., in the direction of the arrow (52) as shown in FIG. 5(A). This is because the guide slot (14) of the holding plate (15) engaging with the guide bush (13) is formed orthogonally to the longitudinal direction. In this manner, the holding plate (15) is moved so that the turnup (19) on the front end thereof may be superposed on the initial end of the film (1). FIG. 5(A) shows such state, and wherein since the holding plate (15) is in contact with the guide bush (13) at the upper end face of the guide slot (14), the holding plate cannot move downward any more. Accordingly, when further pushing the operating plate (17) in the direction of the arrow, the guide bush (13) comes to contact the upper end face of the guide slot (16), and the operating plate (17) reaches the stroke end. Meanwhile, the operating plate (17) moves left and downward over the holding plate (15) under the immovable state, and the obliquely chamfered extending side of the operating plate (17) runs on the upwardly inclined surface of the angle portion of the holding plate (15). Since the holding plate (15) is formed of a flexible material as compared with the operating plate (17), the front end portion thereof is curved on the drum (2) side so that the turnup (19) may hold the initial end of the film (1) on the surface of the drum (2).

When pushing the operating plate (17) at the left side turnup (21) in the opposite direction of the arrow (51), the operation is performed in reverse order and the film end holding state is released.

In the case of the film end holding device (E) for the terminal end of a film, as is shown in FIG. 5(B), a guide slot (16') is formed with its left side extending obliquely upward on the operating plate (17'). When pushing this operating plate (17') in the direction of the arrow (51) by engaging the turnup (21), the holding plate (15') moves upward, i.e., in the direction of the arrow (53). The guide slot (16') is formed with its left side obliquely upward because in the film fixation in a dark room, it is preferable that both initial end (E) and terminal end (B) are treated to move in the same direction (i.e., in the direction of the arrow (51).

Figure 7:
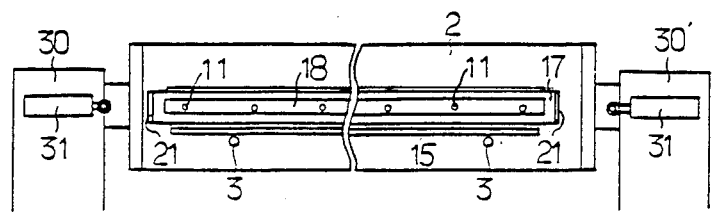
FIG. 7 is an elevational view of the recording drum on which the device for initial end of a film according to the invention is mounted.

The operation described above can be also performed automatically other than by manual operation. By fixing an actuator such as an air cylinder (31) at a certain height to left and right bearings (30), (30') supporting a rotary shaft of the drum (2), as shown in FIG. 7, the operating plate (17) can be pushed left and right by the turnup (21) through a roller rotatably fitted to a front end of the actuation rod.

It is also preferable that the operating plates (17) (17') are provided with click stops (not shown) to prevent movement during rotation of the drum.

Referring then to FIG. 8, operation of the film end holding device (E) for terminal end is described hereunder.

Figure 8A:
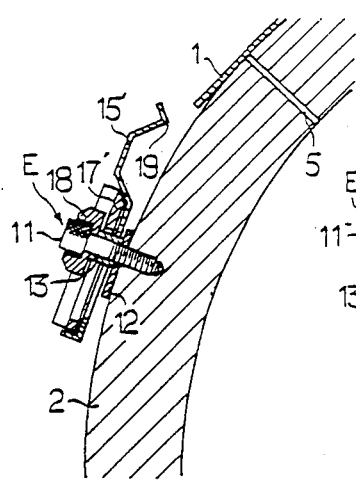
FIGS. 8a–8c are sectional side views of the device for the terminal end of a film to show the operational order thereof.
Figure 8B:
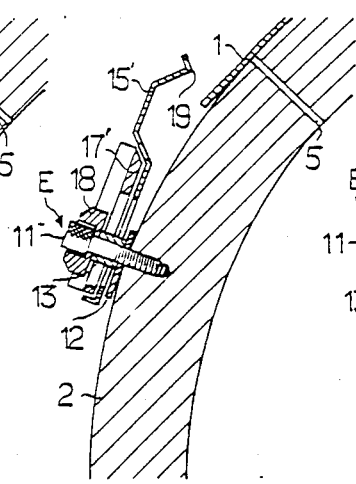
Figure 8C:
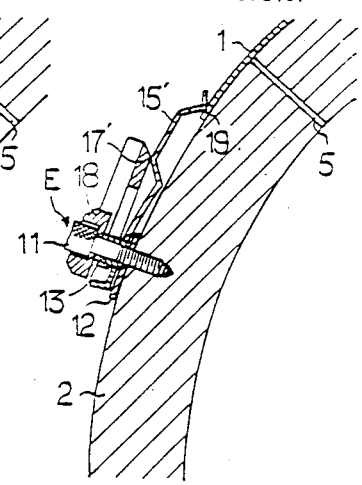

FIG. 8(a) shows a state that the holding plate (15') has begun to move toward the rear part of the film (1) by pushing the operating plate (17') in the longitudinal direction. FIG. 8(b) shows a state that the guide slot (14') of the holding plate (15') has contacted the guide bush (13) and the holding plate (15') has been moved by the operating plate (17') to an end position. Under such state, the turnup (19') of the holding plate (15') is positioned near above the terminal end of the film (1) but not in contact with the film (1). In FIG. 8(c), the operating plate (17') is further pushed in the longitudinal direction and, as a result, the operating plate (17') runs on the upwardly inclined surface of the angle portion of the holding plate (15') to the extend of curving the holding plate (15') downward, i.e., toward the drum (2) side. Since the side of the holding plate (15') opposed to the terminal end of the film is trapezoidally formed with a plain part on its top and an overhang of the turnup (19) acting as a holding section extending from the sheet plate (12) is secured as described above, even a small movement of the longer side of the angle portion attains a large displacement toward the drum (2) side at the turnup (19).

Further, since the holding plate (15') is composed of a flexible material, even when the angular side is excessively pushed by the operating plate (17'), the holding plate (15') bends over the overhang sufficiently extended to the turnup (19) so that the turnup (19) may hold the terminal end of the film (1).

Figure 9:
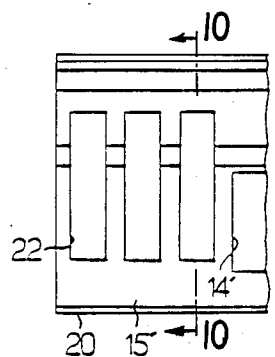
FIG. 9 is a plan view of a holding plate of the device for the terminal end of a film.
Figure 10:
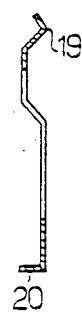
FIG. 10 is a sectional side view taken along the line 10—10 of FIG. 9.

As seen from FIG. 9 showing a partial plan view of the holding plate (15') and FIG. 10 showing a sectional side view taken along the line 10—10 of FIG. 9, it is also preferred that the holding plate (15) be provided with several slitlike apertures (22) in order to reduce the centrifugal force acting on the holding plate (15') during high speed rotation of the drum (2) and to produce easily the flexibility by the operation of the operating plate (17').

In addition, it is necessary for the actuation stroke of the actuator (31) for the operating plate (17') of the film end holding device (B) for the initial end to be adapted to the film end holding device (E) for the terminal end.

Imbalance occurring in the drum (2) due to attachment of this device should be appropriately corrected beforehand.

As a matter of course, an embodiment of the film end holding device (B) for the initial end alone is in the scope of the invention.

We claim:

1. A film end holding device comprising a film holding plate (15), an operating plate (17), a plurality of guide bushes (13) and a contact member (18), each provided on a portion of a drum (2) near an end of a film (1) mounted on a periphery of the drum being taken up thereon, and wherein;

said holding plate (15) has a plurality of guide slots (14) in the circumferential direction of the drum (2), an extending side of the holding plate (15) opposed to the end of the film (1) is formed into an angular portion with its front end bent to be a film contact section (19), while the opposite extending side being bent to be a turnup (20);

said operating plate (17) has a plurality of guide slots (16) oblique to an axial direction of the drum (2) for sliding movement within bent portions of the holding plate (15) in the axial direction of the drum;

said contact member (18) of sufficient rigidity fixed to the drum (2) by engaging said guide slots (14),(16) of the holding plate (15) and the operating plate (17) with said bushes (13) so that the holding plate (15) may slide in the circumferential direction on the surface of the drum while holding the operating plate (17) inside by means of a plurality of set bolts (11) through said guide bushes (13); and said operating plate (17) moving obliquely when pushed in the axial direction of the drum, whereby the holding plate (15) moves in the circumferential direction of the drum (2) by a length of the guide slot (14) and the operating plate (17) runs on the angle portion of the holding plate (15) so that the end of the film (1) may be held by curving the contact member (19) of the holding plate (15) toward the surface of the drum (2).

2. A film end holding device as claimed in claim 1, wherein a sheet plate (12) is fixed between the surface of the drum (2) and the holding plate (15) through the guide bush (13) so that the holding plate (15) may slide smoothly on the surface of the drum (2).

3. A film end holding device as claimed in claim 1, wherein an extending side of said operating plate (17) which contacts an upwardly inclined surface of an upwardly inclined surface of the angular extending portion of the holding plate (15) is chamfered so as to serve in cooperation with said upwardly inclined surface of the holding plate (15).

* * * * *